UNITED STATES PATENT OFFICE.

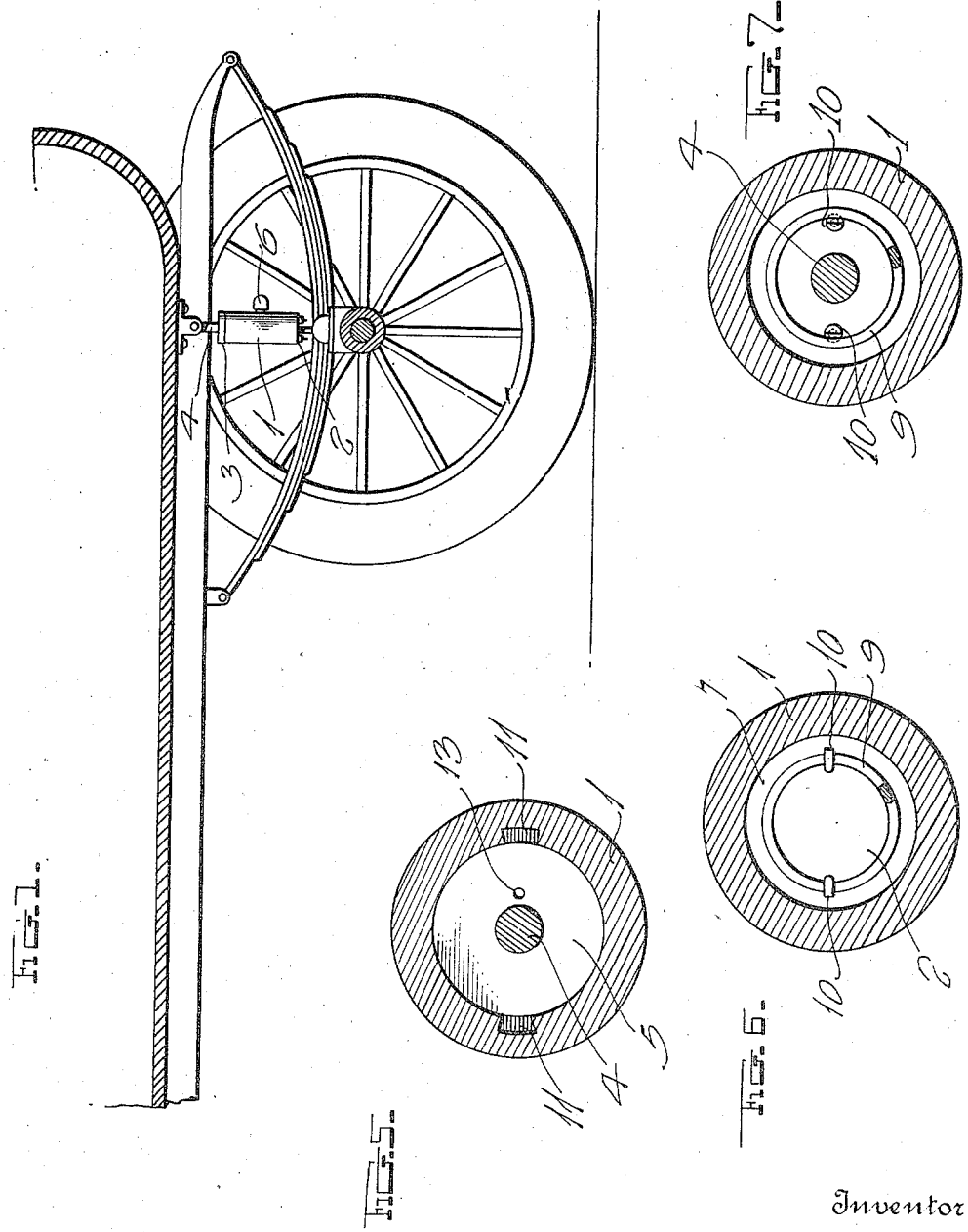

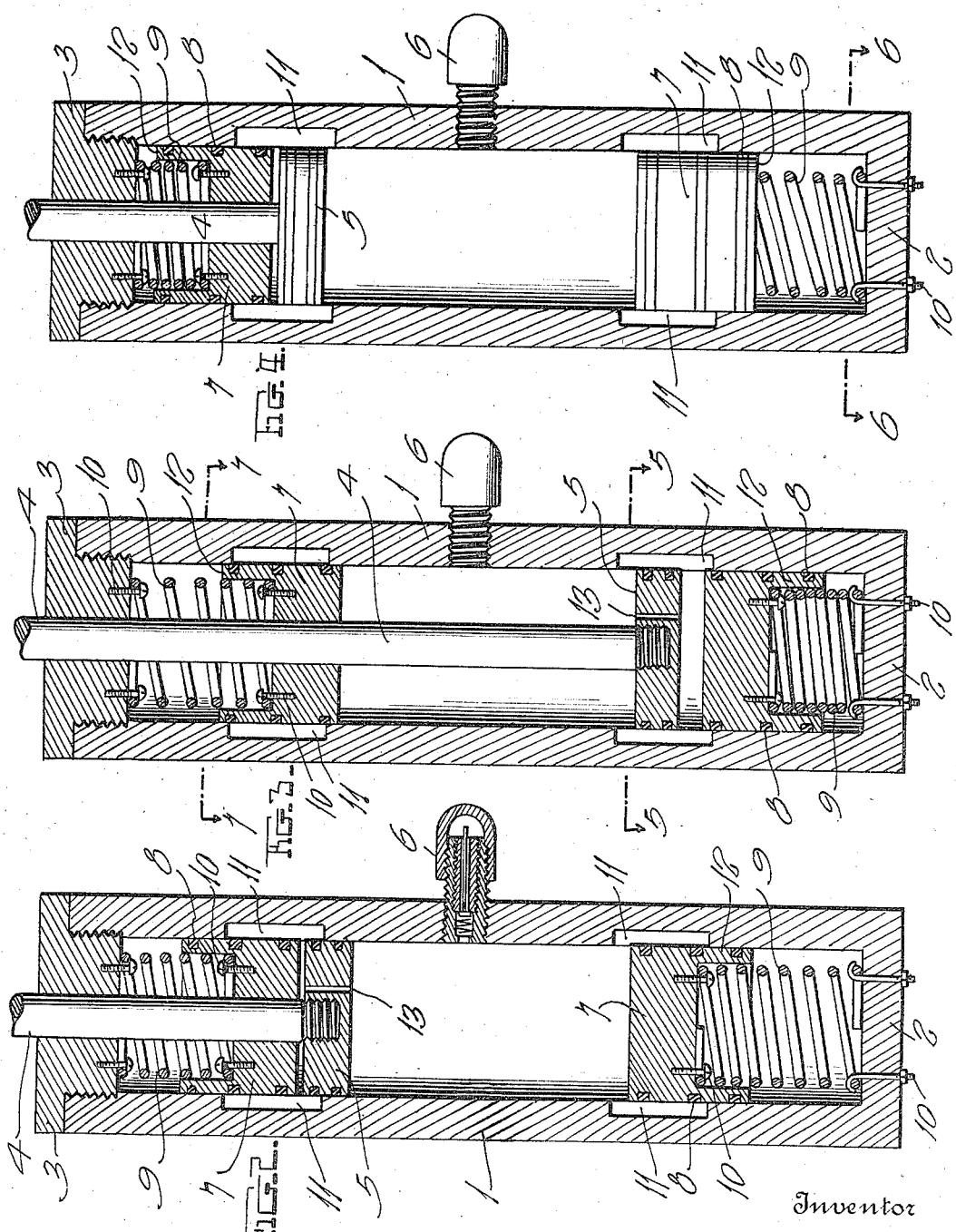

SAMUEL R. COOK, OF SAN JOSE, CALIFORNIA.

PNEUMATIC SHOCK-ABSORBER.

1,261,011.	Specification of Letters Patent.	Patented Apr. 2, 1918.

Application filed June 28, 1917. Serial No. 177,561.

*To all whom it may concern:*

Be it known that I, SAMUEL R. COOK, a citizen of the United States, residing at San Jose, in the county of Santa Clara and State of California, have invented certain new and useful Improvements in Pneumatic Shock-Absorbers; and I do declare the following to be a full, clear, and exact description of the invention, such as will enable others skilled in the art to which it appertains to make and use the same.

My invention relates to shock absorbing devices and more particularly to that class of absorbers which are designed to be applied to vehicles and the like, and which embody a pneumatic cushion to absorb all the vibrations and shocks.

The primary object of my invention is to provide a pneumatic shock absorber in which the initial shock is absorbed on a cushion of air, and at a certain point of compression of the air, the shock is taken up on a spring buffer to provide the ultimate cushion for the mechanism employed in my device.

A further object of my invention is to provide an improved shock absorber of this character which will act to absorb the shock on the downward as well as the upward motion of the vehicle or spring to which it is attached, equally and in the same proportion.

A still further object of my invention is to provide a shock absorber of this character which may be readily regulated to the load upon which it is designed to act, and in which means are provided to at all times maintain a balance in the proportionate pressure of the compressed air within the absorber.

Another object of the invention is to provide a shock absorber of this character which is cheap to manufacture, easy to take apart and assemble, and which is easily applied and most efficient in operation.

With these and other general objects in view which will appear from the description, my invention resides in the novel combination, construction and arrangement of parts to be more fully hereinafter described and claimed, and taken in connection with the accompanying drawings which form a part of this application and in which:

Figure 1 is substantially a longitudinal section through a vehicle showing my improved shock absorber applied thereto;

Fig. 2 is a vertical central sectional view illustrating the improved device;

Fig. 3 is a similar view illustrating one phase in the operation thereof;

Fig. 4 is a similar view partly in elevation illustrating another phase in the operation thereof;

Fig. 5 is a horizontal sectional view on the line 5—5 of Fig. 3;

Fig. 6 is a horizontal sectional view on the line 6—6 of Fig. 4; and

Fig. 7 is a horizontal sectional view on the line 7—7 of Fig. 3.

Briefly described, my invention comprises a cylinder having air stored therein under pressure and in which operates a plunger for further compression of the air within the cylinder to absorb all shocks and vibrations. The cylinder and the plunger, through the medium of its stem, are connected to suitable parts of the vehicle axle and frame and are relatively movable toward one another, and cushioning members are provided at the ends of the cylinder to form an ultimate cushion for the plunger in its travel in the cylinder. Means are also provided whereby at predetermined points in the travel of the plunger, to discharge the compressed air at the opposite side of the plunger, whereby to provide for an equal absorbing action of the plunger on its return travel.

Referring more particularly to the invention and describing the same in detail, the numeral 1 designates a cylindrical casing having a closed end 2 and having its opposite end closed by a removable cap or head 3 which is suitably apertured to provide for the movement therethrough of a stem 4 having a plunger head 5 mounted on its inner end for reciprocating movement within the cylinder. A valve 6 is disposed in the wall of the cylinder at a suitable point whereby air may be stored in the cylinder under compression, and it is obvious that according to the degree of pressure with which the air is stored, the device may be regulated to act to the different loads upon which it is used.

Adjacent the ends of the cylinder, I provide a pair of slidable buffer members 7 which are disposed for fluid-tight engagement with the walls of the cylinder by means of packing rings 8 of any approved type. These buffer members are disposed at opposite sides of the plunger head and one member is suitably apertured to provide for the reception therethrough of the stem 4 of the plunger, whereby the stem and adjacent buffer member are relatively slidable upon one another.

Coiled expansion springs 9 are disposed between the ends of the cylinder and the buffer members and are secured thereto by means of retaining bolts 10 anchored in the buffer members and in the ends of the cylinder respectively, whereby the springs will provide a means for limiting the inward movement of the buffer members, while at the same time serving to hold the buffers in extended relation on the ends of the cylinders and inwardly toward the plunger head.

Spaced inwardly from the ends of the cylinders are by-passes 11 consisting of channels formed in the walls of the cylinders, which are of greater length than the thickness of the plunger head 5. The buffer members 7 when in normal extended position rest adjacent these by-passes and are disposed to slide between the by-passes and the adjacent ends of the cylinders in their operation, as will be hereinafter described. Rearwardly extending annular flanges 12 are formed on each of the buffer members to prevent any air from entering behind the heads and destroying the cushioning effect of the springs 9. These flanges 12 extend rearwardly a sufficient distance to accomplish this result, and also serve as a guide for the coiled spring when the same is being retracted and expanded.

It is necessary in the operation of the absorber that some means exist whereby the pressure may be substantially equalized at opposite sides of the plunger head at certain stages of the operation, and to accomplish this end I provide a small bore 13 extending through the plunger head at any suitable point. The plunger head may be secured on the end of the stem 4 in any approved manner, and the ends of the cylinder having the bolts 10 extending therethrough as well as the end of the cylinder having the stem movable therethrough, are provided with a suitable packing to prevent the escape of air from the cylinder.

In the operation of my device, when the shock is received upon the stem 4 the plunger head will be forced inwardly in the cylinder, thereby compressing the air ahead of it and between the head and the adjacent buffer member at the opposite end of the cylinder. Assuming that the normal position of the plunger head is in the position as indicated in Fig. 2, the air stored within the cylinder will be compressed between the head and the buffer member which, owing to the action of the expansion spring 9, will slowly yield and be forced toward the end of the cylinder, thereby providing for a yieldable compression of the air between the end of the cylinder and the buffer member, which will provide for a gradual absorbing of the shock and eliminating any sudden check which may be detrimental to the mechanism of the device. When the plunger head has traveled inwardly a sufficient distance it will assume the position as indicated in Fig. 3 whereby the plunger head will be positioned adjacent the by-passes 11 at one end of the cylinder, allowing the air compressed between the head and the adjacent buffer member to be discharged at the opposite side of the head, upon which discharge the plunger head will come in contact with the buffer member adjacent thereto, and further cushioning of the head will take place through the medium of the buffer member and the coiled spring 9. On the return stroke, the air will then be compressed between the opposite side of the plunger head and the opposite buffer member, with the same principle of operation, and when the plunger head has traveled to the opposite end of the cylinder it will be entered into the by-passes adjacent thereto, whereby the air will be discharged at the other side of the cylinder for the next cycle of operation.

It is apparent that all shocks will not be sufficient to cause the plunger to travel the extremes of the cylinder, and when such is the case, the cushioning effect will take place through the movement of the buffer provided in the end of the plunger head. On a slighter shock, the plunger head will be caused to travel only a short distance, and air will be gradually released through the small bore 13 to the opposite side of the head, providing a slow and effective cushioning.

In this improved form of my invention and in the accompanying drawings, I have illustrated the improved shock absorber as having the plunger stem 4 in communication with the body of the vehicle and the cylinder in connection with the axle of the vehicle, but it is perfectly obvious, and I desire it to be understood that the absorber need not be used in this adaptation alone, but that it may be applied to springs, or in fact to any construction where it is desired to use an efficient absorber of the type embodied in my invention. Furthermore, while I have described and shown certain specific materials and details entering into the construction of the device, I do not wish to limit myself to these, or intend that any such may be used as will fall within the scope of the invention as claimed.

I claim:

1. A shock absorber comprising a cylinder having a fluid therein, a plunger movable therein, a buffer member adjacent one end of the cylinder whereby to permit of gradual compression of the fluid between said plunger and member, means to permit discharge of the fluid at a predetermined point to the other side of the plunger, said buffer acting as a cushioning member for the plunger after the discharge of the fluid to the other side of the plunger head.

2. A shock absorber comprising a cylinder having a fluid therein, a plunger movable in the cylinder, a slidable member in fluid-tight engagement with the walls of the cylinder adjacent one end thereof, a spring to force said member toward said plunger to permit of gradual compression of the fluid between said plunger and member, by-passes in the walls of said cylinder to be opened by the plunger at a predetermined point of its travel and allow the fluid to flow to the other side of the plunger and act as additional cushion on the rebound, said member on discharge of the fluid serving as a buffer for the plunger.

3. A shock absorber comprising a cylinder and a plunger movable therein, one having connection with a vehicle frame, the other having connection with the axle of a vehicle, said cylinder having a fluid therein, a spring pressed member in the cylinder for yieldable compression of the fluid between the member and plunger, said cylinder having by-passes therein to discharge the fluid at the opposite side of the plunger at a predetermined point in its travel, said spring pressed member serving as a buffer for the plunger, and buffer means at the opposite end of the cylinder.

4. A shock absorber comprising a cylinder having a fluid therein, a plunger movable therein, the walls of said cylinder being channeled to provide by-passes for the discharge of the fluid alternately at opposite sides of the plunger, said by-passes being spaced from the ends of the cylinder, and spring buffers to slide between the by-passes and cylinder ends and permit yieldable compression of the fluid and also serving upon discharge of the fluid through the by-passes to cushion the plunger.

5. A shock absorber comprising a cylinder having a fluid therein, a plunger movable in the cylinder, buffer members adjacent the ends of said cylinder, springs to normally force said buffers inwardly toward the plunger for yieldable compression of the fluid therebetween, said cylinder having in its walls by-passes disposed adjacent the ends whereby to be opened at predetermined points in the travel of the plunger and alternately discharge fluid to the opposite side of the plunger, and means to equalize pressure in the cylinder.

6. A shock absorber comprising a cylinder having a fluid therein, a plunger movable therein, buffer members at opposite ends of the cylinder and in slidable fluid-tight engagement with the walls thereof, expansion springs between said members and the ends of the cylinder and in connection therewith to limit the inward movement of said members and provide for yieldable compression of the fluid, by-passes in the walls of the cylinder and of greater length than the thickness of said plunger, whereby to alternately deliver the fluid at opposite sides of the plunger, said by-passes being disposed adjacent the buffer members, whereby the buffers will cushion the plunger upon release of the fluid through the by-passes.

In testimony whereof I have hereunto set my hand in the presence of two subscribing witnesses.

SAMUEL R. COOK.

Witnesses:
CHARLES E. CORBIN,
ROLAND NEAL.